(12) United States Patent
Tanaka et al.

(10) Patent No.: US 6,421,484 B2
(45) Date of Patent: Jul. 16, 2002

(54) OPTICAL FIBER TRANSMISSION LINE AND OPTICAL CABLE INCLUDING THE SAME

(75) Inventors: Shigeru Tanaka; Masayuki Nishimura, both of Yokohama; Hiroshi Ishisaki, Kitakyushu, all of (JP)

(73) Assignees: Sumitomo Electric Industries, Ltd., Osaka; OCC Corporation, Tokyo, both of (JP)

( * ) Notice: Subject to any disclaimer, the term of this patent is extended or adjusted under 35 U.S.C. 154(b) by 39 days.

(21) Appl. No.: 09/736,236

(22) Filed: Dec. 15, 2000

(30) Foreign Application Priority Data

Dec. 15, 1999 (JP) ............................................. 11-356061

(51) Int. Cl.$^7$ ................................................. G02B 6/44
(52) U.S. Cl. ........................... 385/100; 385/123; 385/24
(58) Field of Search ................................. 385/100, 123, 385/24

(56) References Cited

U.S. PATENT DOCUMENTS

| | | | | |
|---|---|---|---|---|
| 5,701,188 A | * | 12/1997 | Shigematsu et al. | ........ 359/130 |
| 5,778,128 A | | 7/1998 | Wildeman | |
| 5,894,537 A | | 4/1999 | Berkey et al. | |
| 5,995,694 A | | 11/1999 | Akasaka et al. | |
| 6,178,279 B1 | * | 1/2001 | Mukasa et al. | ............. 385/123 |
| 6,266,467 B1 | * | 7/2001 | Kato et al. | .................. 385/123 |
| 6,301,419 B1 | * | 10/2001 | Tsukitani et al. | ............ 385/123 |

FOREIGN PATENT DOCUMENTS

| | | |
|---|---|---|
| JP | 9-318824 | 12/1997 |
| JP | 10-73738 | 3/1998 |

OTHER PUBLICATIONS

M. Tsukitani et al., "Low–Loss Dispersion–Flattened Hybrid Transmission Lines Consisting of Low–Nonlinearity Pure–Silica–Core Fibers and Dispersion Compensating Fibers."

* cited by examiner

Primary Examiner—Hung N. Ngo
(74) Attorney, Agent, or Firm—McDermott, Will & Emery

(57) ABSTRACT

The present invention relates to an optical fiber transmission line comprising a structure for making it possible to maintain a desirable mean transmission characteristic as a whole regardless of the fluctuation in total length caused upon cutting end portions; and an optical cable including the same. The optical fiber transmission line according to the present invention comprises a main transmission line and first and second end sections connected, respectively, to both ends of the main transmission line. As a typical configuration, the main transmission line is constituted by a single-mode optical fiber and a dispersion-compensating optical fiber. At a wavelength of 1.55 $\mu$m, the single-mode optical fiber has a positive chromatic dispersion, and the dispersion-compensating optical fiber has a negative chromatic dispersion. The respective chromatic dispersions and lengths of the single-mode optical fiber and dispersion-compensating optical fiber are set so as to lower the absolute value of mean chromatic dispersion of the main transmission line as a whole, whereas each of the first and second end sections has a chromatic dispersion substantially equal to the mean chromatic dispersion in order to suppress the influence upon the mean of the optical fiber transmission line as a whole caused by the fluctuation in length due to the cutting.

25 Claims, 10 Drawing Sheets

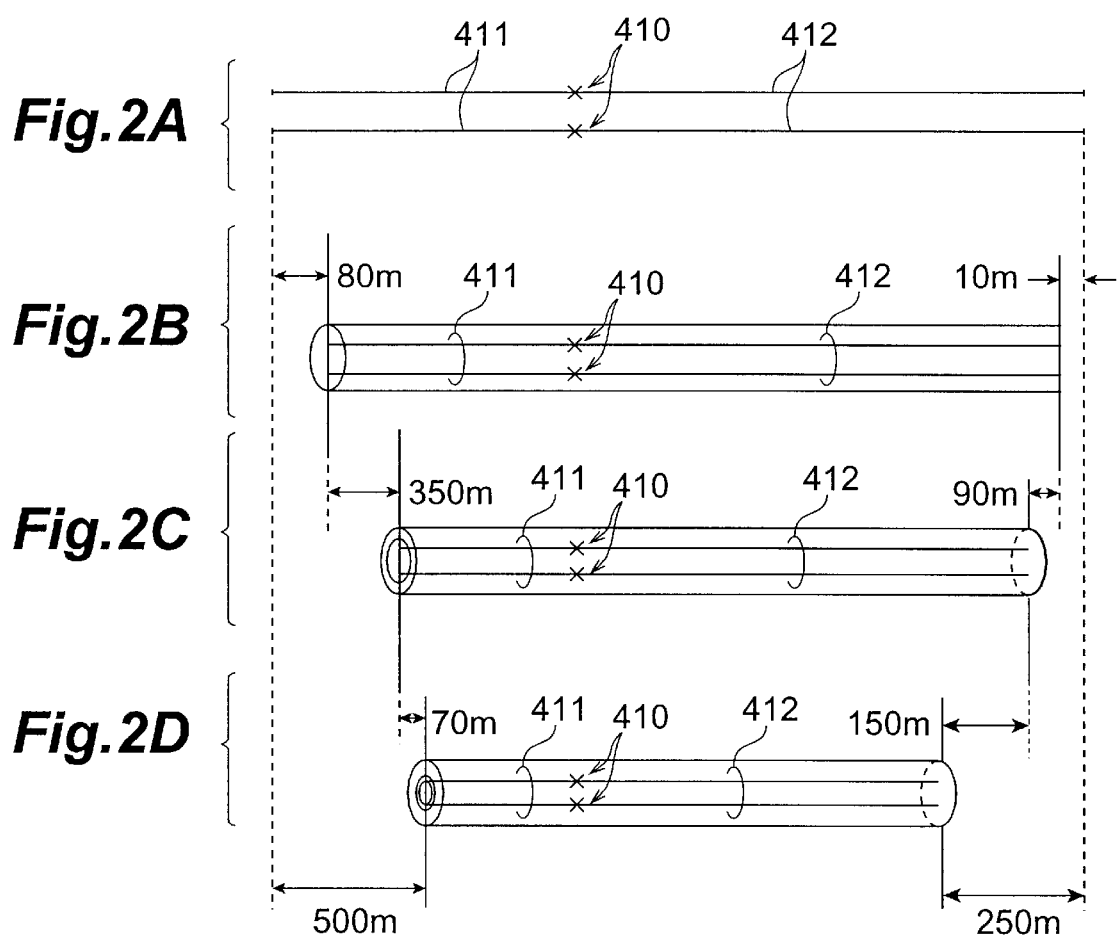

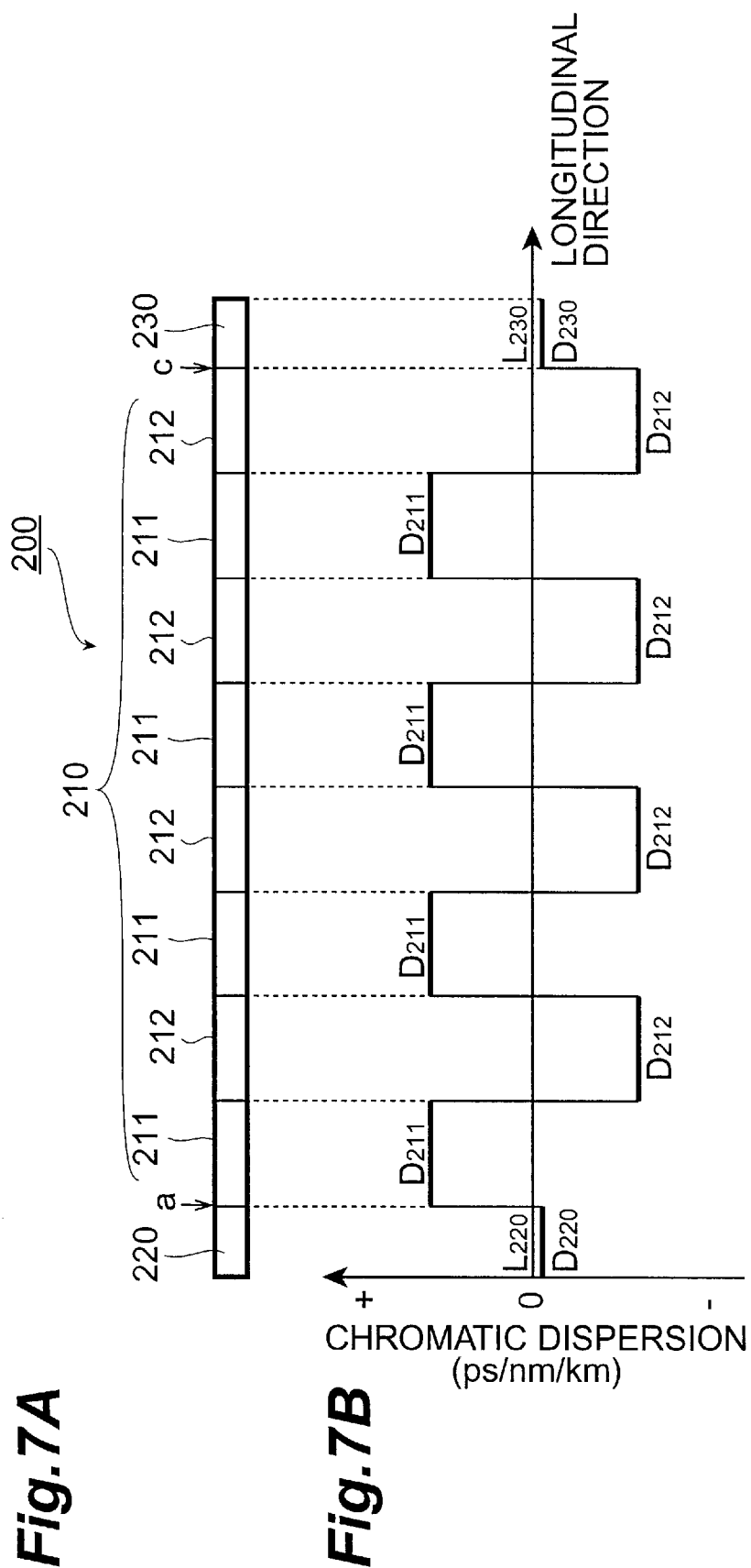

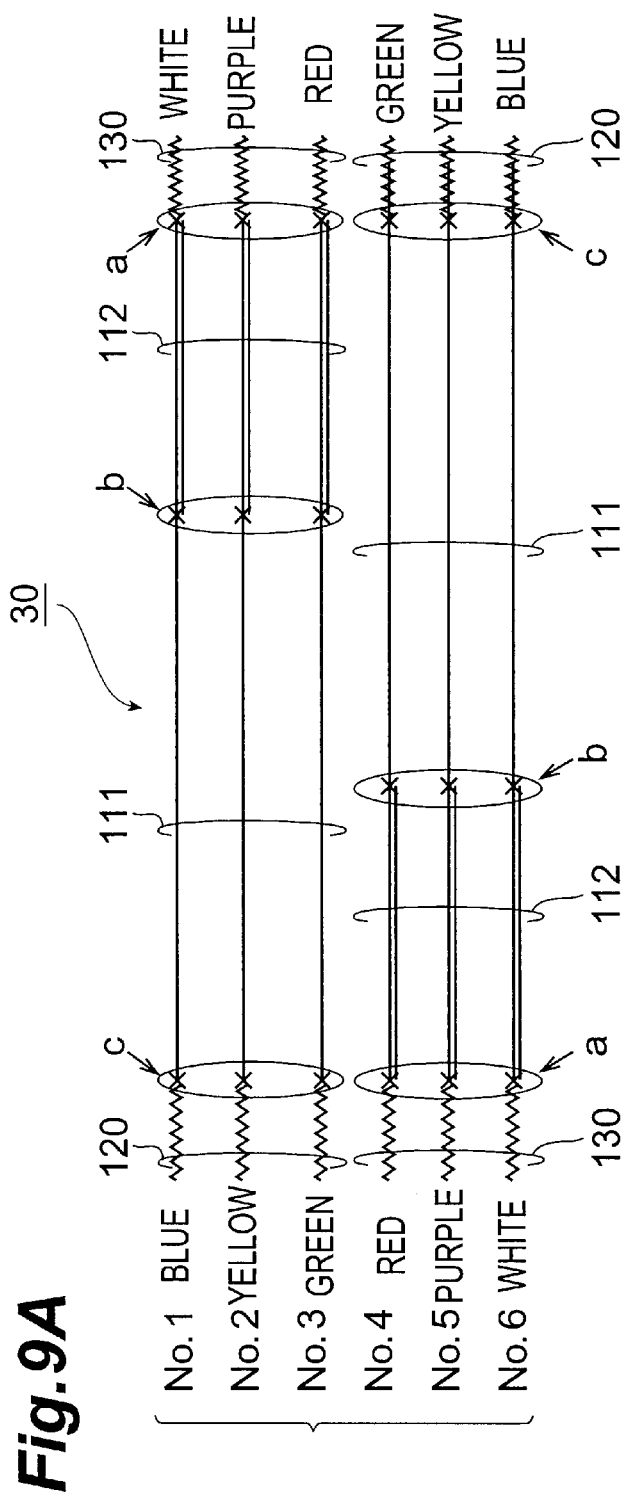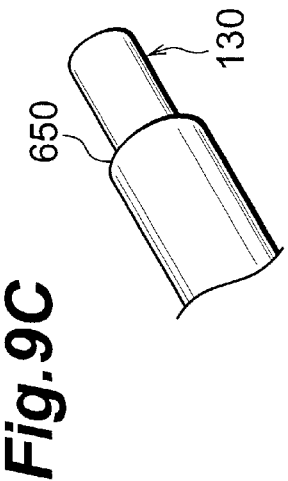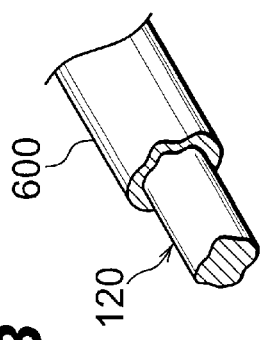

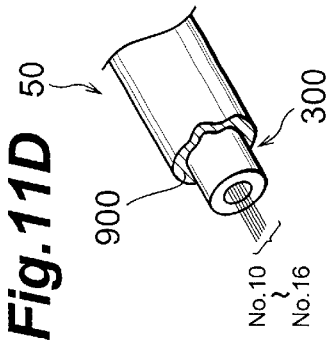
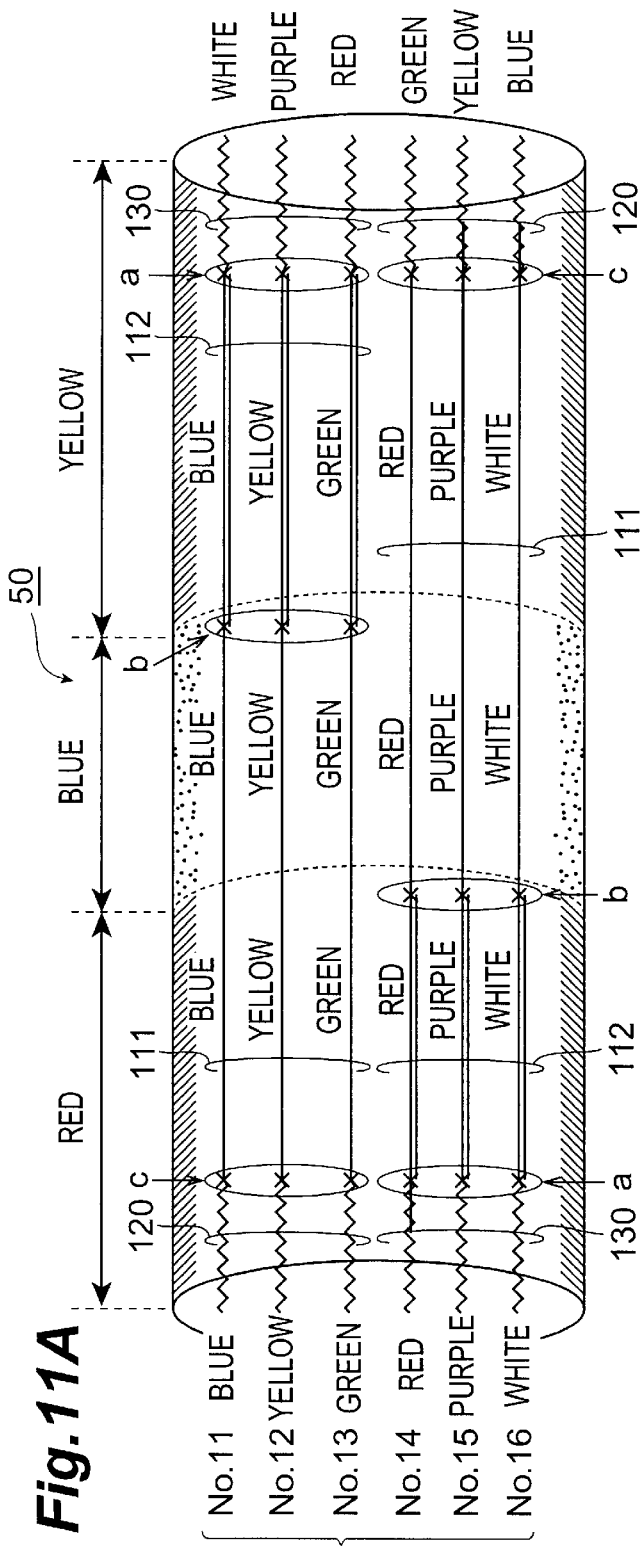
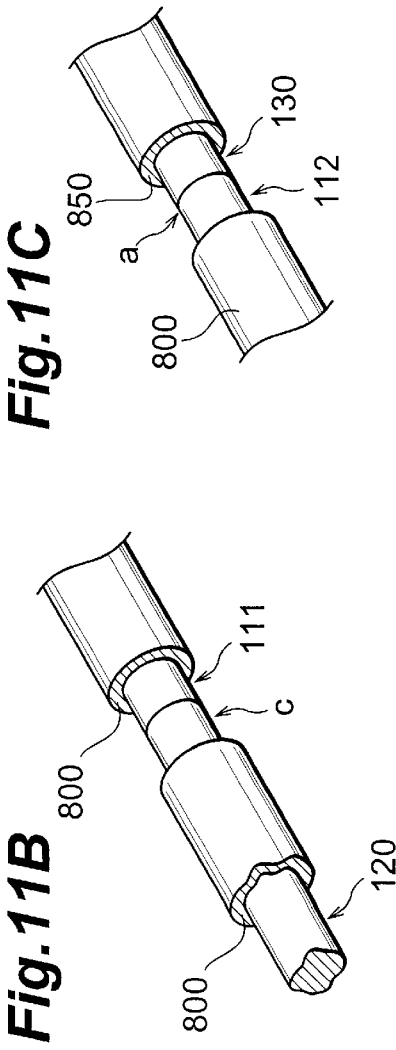

OPTICAL FIBER TRANSMISSION LINE AND OPTICAL CABLE INCLUDING THE SAME

BACKGROUND OF THE INVENTION

1. Field of the Invention

The present invention relates to an optical fiber transmission line employable as an optical transmission line in a wavelength division multiplexing (WDM) transmission system, and an optical cable including the same.

2. Related Background Art

A WDM transmission system enables high-speed, large-capacity optical communications by utilizing a plurality of signal channels. The optical transmission line laid in each repeating section of the WDM transmission system is desired to have an excellent transmission characteristic in a signal wavelength region (e.g., 1.55-$\mu$m wavelength band). Therefore, as an optical transmission line having an excellent signal transmission characteristic, optical fibers whose transmission characteristic changes along the longitudinal direction thereof have been proposed.

For example, a conventional optical fiber transmission line described in T. Naito, et al., "1 Terabit/s WDM Transmission over 10,000 km," ECOC 99, PD2-1 (1999) (first literature) is constituted by a single-mode optical fiber (an optical fiber having a positive chromatic dispersion) positioned on the upstream side in the signal-advancing direction and a dispersion-compensating optical fiber (an optical fiber having a negative chromatic dispersion) positioned on the downstream side. In the 1.55-$\mu$m wavelength band, the single-mode optical fiber has a positive chromatic dispersion and a relatively large mode field diameter. On the other hand, the dispersion-compensating optical fiber has a negative chromatic dispersion and a relatively small mode field diameter in the 1.55-$\mu$m wavelength band, and is likely to generate nonlinear optical phenomena in general.

In the conventional optical fiber transmission line described in the above-mentioned first literature, signals successively propagate through the single-mode optical fiber and dispersion-compensating optical fiber. Though the signals propagating through the single-mode optical fiber have a high power, nonlinear optical phenomena are restrained from occurring since the single-mode optical fiber has a relatively large mode field diameter. The signals lower their power while propagating through the single-mode optical fiber, and the signals having lowered their power reaches the dispersion-compensating optical fiber. As a consequence, the occurrence of nonlinear optical phenomena is sufficiently suppressed even when the signals propagate through the dispersion-compensating optical fiber having a relatively small mode field diameter. Further, since the single-mode optical fiber and dispersion-compensating optical fiber have chromatic dispersions different from each other, the cumulative chromatic dispersion of the optical fiber transmission line as a whole will be kept low if the ratio of their lengths is designed appropriately. Thus, an optical fiber transmission line in which a single-mode optical fiber and a dispersion compensating optical fiber are successively disposed along the signal-advancing direction can effectively restrain the transmission quality from deteriorating due to nonlinear optical phenomena and cumulative chromatic dispersion.

On the other hand, the optical fiber transmission line disclosed in U.S. Pat. No. 5,894,537 (second literature) is a unitary optical fiber in which a plurality of positive dispersion portions having a positive chromatic dispersion and a plurality of negative dispersion portions having a negative chromatic dispersion are alternately arranged adjacent each other along its longitudinal direction. The occurrence of nonlinear optical phenomena, such as four-wave mixing in particular, is suppressed when the absolute value of chromatic dispersion in each of the positive and negative dispersion portions is set greater, and the deterioration in transmission quality caused by cumulative chromatic dispersion is suppressed when the absolute value of mean chromatic dispersion in the optical fiber transmission line as a whole is set lower.

SUMMARY OF THE INVENTION

The inventors have studied the conventional techniques mentioned above and, as a result, have found problems as follows. Namely, the conventional optical fiber transmission line described in the first literature is required to change its transmission characteristic along the longitudinal direction while yielding a desirable value of mean transmission characteristic in the optical fiber transmission line as a whole. Consequently, each optical fiber constituting this optical fiber transmission line is restricted in terms of its transmission characteristic or its length. That is, the conventional optical fiber transmission line is required to have a small mean chromatic dispersion as a whole, whereby it is necessary that the ratio of respective lengths of the single-mode optical fiber and dispersion-compensating optical fiber constituting the optical fiber transmission line be set to a predetermined value.

The conventional optical fiber transmission line described in the above-mentioned second literature is also required to have a small mean chromatic dispersion as a whole, whereby it is necessary that the ratio of respective lengths of the positive and negative dispersion portions be set to a predetermined value.

Even when an optical fiber transmission line designed so as to yield a desirable mean transmission characteristic as a whole is made, if an end portion of this optical fiber transmission line is cut off, then the mean transmission characteristic of thus cut optical fiber transmission line as a whole may not attain the desirable value. When the process of making an optical cable from an optical fiber transmission line such as that mentioned above is concerned, for example, both end portions of each optical fiber are cut off until a desirable condition is obtained in each of steps of welding water-pressure-resistant copper tubes, extruding sheaths, and the like in the case of the optical fiber transmission line. The fiber lengths (hereinafter referred to as "cut lengths") of both end portions cut in such individual steps amount to several hundreds of meters.

Between before and after the cutting, the mean transmission characteristic of the optical fiber transmission line as a whole changes according to the cut length. In a transmission line in which a chromatic dispersion with a large absolute value locally occurs, such as the optical fiber transmission lines described in the above-mentioned first and second literatures in particular, the change in mean transmission characteristic (mean chromatic dispersion) in the optical fiber transmission line as a whole between before and after the cutting is large.

Concerning the optical fiber transmission line described in the above-mentioned first literature, the problem mentioned above will be explained specifically with reference to a case of making a submarine optical cable having a cross-sectional structure shown in FIG. 1A by way of example. Here FIG. 1A is a view showing the cross-sectional structure of the submarine optical cable, whereas FIG. 1B is a view showing the cross-sectional structure of the optical fiber unit included in the submarine optical cable. On the other hand, FIGS. 2A to 2D are views showing respective changes in the length of optical fiber transmission line in individual steps of making the optical cable.

As shown in FIG. 1A, a three-part metal tube 310, a high-tension steel twisted wires 320, a copper tube 330, and an insulating plastic layer 340 are successively disposed on the outer periphery of an optical fiber unit 300 holding a plurality of optical fiber transmission lines, so as to construct the optical cable. Here, as shown in FIG. 1B, the optical fiber unit 300 has a structure in which a plurality of optical fiber transmission lines 410 are secured about a tension member 420 by way of a buffer layer (unit filler resin) 430.

Before bundling, each optical fiber transmission line 410 is, as shown in FIG. 2A, constituted by a single-mode optical fiber 412 (SMF: Single-Mode optical Fiber) and a dispersion-compensating optical fiber 411 (DSF: Dispersion-Compensated optical Fiber) having chromatic dispersions of about 20 ps/nm/km and about −45 ps/nm/km, respectively.

At the time of bundling, a plurality of optical fiber transmission lines 410 whose end portions on the SMF side and the DCF side are cut by 10 m and 80 m, respectively, as shown in FIG. 2B. Then, upon welding water-pressure-resistant copper tubes, the end portions on the SMF side and the DCF side are cut by 90 m and 350 m, respectively (FIG. 2C). Also, upon extruding a sheath, the end portions on the SMF side and the DCF side are cut by 150 m and 70 m, respectively (FIG. 2D). After the foregoing steps, the cut length finally becomes 250 m on the SMF side, whereby the chromatic dispersion changes by 5 ps/nm (=20 ps/nm/km× 0.25 km) due to the end portion cutting. On the DCF side, on the other hand, the cut length finally becomes 500 m, whereby the chromatic dispersion changes by −22.5 ps/nm (=45 ps/nm/km×0.5 km) due to the end portion cutting. As a consequence, in the case where a plurality of optical fiber transmission lines are bundled so as to make an optical cable as mentioned above, the cumulative chromatic dispersion of each optical fiber transmission line included in the finally obtained optical cable would change by −17.5 ps/nm.

If the cut length in each of both ends of an optical fiber transmission line can be estimated, then each optical fiber transmission line to be cabled may be designed and made while taking account of the amount of change in cumulative chromatic dispersion corresponding to thus estimated cut length. However, the cut length varies depending on whether the conditioning in each step of cable making is fine or not, and further increases (thereby shortening the total length of optical fiber transmission line) if a trouble occurs, whereby the transmission characteristic greatly fluctuates among the resulting optical cables. Therefore, the cut length upon making cables cannot be estimated in practice, and the amount of change in cumulative chromatic dispersion upon cabling cannot be estimated, either.

Meanwhile, the cumulative chromatic dispersion of each optical fiber transmission line is required to match its designed value with an error of about several ps/nm on average in the case of a submarine optical cable. If the cumulative chromatic dispersion changes by several tens of ps/nm due to the end portion cutting as mentioned above, and the amount of change in cumulative chromatic dispersion varies according to uneven cut lengths, however, then it is difficult for the cumulative chromatic dispersion of each optical fiber transmission line included in a single optical cable to match its designed value with an error of about several ps/nm. This is particularly remarkable in the case where a single submarine optical cable corresponds to the whole repeating section, and is similarly remarkable in the case of a ground optical cable. Here, the repeating section refers to any of a section from a transmitting station to a repeater station including an optical amplifier or the like, a section between repeaters, and a section from a repeater station to a receiving station.

In addition, the optical fiber transmission line whose transmission characteristic changes along its longitudinal direction further has a problem as follows. Namely, the optical fiber transmission line described in the above-mentioned first literature has a directivity concerning the advancing direction of signals such that the signals propagate only in one direction from the single-mode optical fiber side to the dispersion-compensating optical fiber side. Since the directivity of the optical fiber transmission line having such a directivity cannot be recognized in appearance, there is a possibility that it cannot be determined from which end portion the signals should be inputted. Though individual fiber transmission lines can be identified if they are painted with respective colors different from each other in an optical cable in which optical fiber transmission lines having such a directivity are bundled, the directivity still cannot be recognized thereby, so that it cannot be determined from which end portion the signals should be inputted, either. Therefore, it is always necessary to grasp whether the end portion of the optical cable in a wound state is on the upstream side (signal-input side) or downstream side (signal-output side) in each step of the manufacturing process and operations for connecting with repeater stations.

In general, inspection,, verification, and the like may be added to the process of making an optical cable according to circumstances. Since rewinding may be effected by a number of times greater than that in a normal manufacturing step as such due to an operational reason, the directivity of optical cable immediately after the making thereof cannot always be determined constant. Consequently, there are cases where a rewinding operation is necessary for rearranging the directivity of optical cable when connecting the optical cable to a repeater station. When the optical cable has a length of 50 km, for example, it takes at least one day to rewind the optical cable, thereby complicating the production control and increasing the operating cost.

In order to overcome the problems mentioned above, it is an object of the present invention to provide an optical fiber transmission line comprising a structure for making extra rewinding operations unnecessary at the time of making a cable, while having a structure for making it possible to maintain a desirable mean transmission characteristic as a whole regardless of the fluctuation in total length accompanying the cutting of end portions; and an optical cable including the same.

The optical fiber transmission line according to the present invention comprises, as a structure suitable for an optical cable, a main transmission line, and first and second end sections connected, respectively, to both ends of the main transmission line. The main transmission line includes an optical fiber whose polarities of chromatic dispersion at a predetermined wavelength alternate along a longitudinal direction thereof. The first end section includes an optical fiber, connected to a first end of the main transmission line, having, at the predetermined wavelength, a chromatic dispersion with an absolute value not greater than that of the mean chromatic dispersion of the main transmission line as a whole. The second end section includes an optical fiber, connected to a second end of the main transmission line opposite from the first end, having, at the predetermined wavelength, a chromatic dispersion with an absolute value not greater than that of the mean chromatic dispersion of the main transmission line as a whole.

The first and second end sections are provided in order to suppress fluctuations of the transmission characteristic of the optical fiber transmission line as a whole in the cable making process, while each of the first and second end sections has a length which is not greater than 5% of the total length of the optical fiber transmission line. The first and second end sections have a maximum degree of influence with an absolute value of 0.2 ps/nm/km or less upon the mean chromatic dispersion of the optical fiber transmission line as a whole, in order to lower the influence of their own fluctuations in length due to cutting upon the optical fiber transmission line as a whole.

In the optical fiber transmission line, the main transmission line may be constituted by a plurality of kinds of optical fibers. In this case, the main transmission line includes one or more first optical fibers having a positive chromatic dispersion at the predetermined wavelength and one or more second optical fibers having a negative chromatic dispersion at the predetermined wavelength, whereas the first and second optical fibers are alternately disposed adjacent each other along the longitudinal direction of the optical fiber transmission line. In the optical fiber transmission line, the main transmission line may include a unitary optical fiber in which one or more first portions (positive dispersion portions) having a positive chromatic dispersion at the predetermined wavelength and one or more second portions (negative dispersion portions) having a negative chromatic dispersion at the predetermined wavelength are alternately disposed adjacent each other along the longitudinal direction thereof. While each case has a locally large chromatic dispersion, the mean chromatic dispersion of the optical fiber transmission line as a whole can be kept low.

Specifically, in the optical fiber transmission line according to the present invention, the first end section has a chromatic dispersion with an absolute value of 5 ps/nm/km or less at the predetermined wavelength, and the second end section also has a chromatic dispersion with an absolute value of 5 ps/nm/km or less at the predetermined wavelength. Since each of the first and second end sections has achromatic dispersion with an absolute value of 5 ps/nm/km or less, the influence of cumulative value of chromatic dispersion upon the whole optical fiber transmission line is small even when their lengths have fluctuated upon cutting. Alternatively, it is preferred that each of the mean transmission characteristic of the main transmission line as a whole and the substantially constant transmission characteristic of each of the first and second end sections be identical to the mean transmission characteristic (e.g., chromatic dispersion at the signal wavelength) of the optical fiber transmission line as a whole. For example, in the case where an end portion of the optical fiber transmission line is partly cut off in the process of cabling, the change in mean transmission characteristic in the optical fiber transmission line between before and after the cutting is small as long as the cutting is effected in the first and second end sections. Namely, if the main transmission line has a desirable mean transmission characteristic, then the optical fiber transmission line maintains a desirable transmission characteristic even when the first and second end sections positioned at end portions of the optical fiber transmission line are partly cut off, whereby a WDM transmission system having a transmission characteristic in conformity to its designed value can be realized if the optical fiber transmission line is employed.

Preferably, in the optical fiber transmission line according to the present invention, each of the first and second end sections has a length of 1000 m or less (5% or less with respect to the total length, for example 50 km, of optical fiber transmission line). In this case, the first or second end section can be subjected to the end portion cutting in the process of cabling, for example. Also, since each of the first and second end sections, which do not always have a transmission characteristic better than that of the main transmission line, is made shorter than the main transmission line, the favorable transmission characteristic of the whole optical fiber transmission line can be maintained.

Preferably, in the optical fiber transmission line according to the present invention, each of the first and second end sections has a mode field diameter substantially identical to that of another optical fiber to be connected thereto, such as a pigtail fiber extending from an optical amplifier disposed within a repeater station, for example. This is because of the fact that the splice loss in the junction between the optical fiber transmission line and the repeater station is kept low thereby.

Preferably, in the optical fiber transmission line according to the present invention, the mean chromatic dispersion of the main transmission line as a whole at the predetermined wavelength has an absolute value of 5 ps/nm/km or less. In this case, the mean chromatic dispersion in the main transmission line and the chromatic dispersion in each of the first and second end sections become substantially identical to each other, whereby the change in mean chromatic dispersion in the optical fiber transmission line between before and after the cutting is kept low as long as the cutting is effected in the first and second end sections. Namely, if the mean chromatic dispersion in the main transmission line is small in this optical fiber transmission line, then the state with a small mean chromatic dispersion is maintained even when the end portion cutting is effected, so that the waveform deterioration caused by nonlinear optical phenomena and cumulative chromatic dispersion is suppressed effectively, whereby a WDM transmission system having a transmission characteristic in conformity to its designed value is realized when this optical fiber transmission line is employed.

Preferably, in the optical fiber transmission line according to the present invention, the main transmission line comprises a first optical fiber having a positive chromatic dispersion at the predetermined wavelength and having an effective area of at least 40 $\mu m^2$, and a second optical fiber having a negative chromatic dispersion at the predetermined wavelength, whereas the first and second optical fibers are successively arranged along a signal-advancing direction. In this case, signals propagate through the first optical fiber to the second optical fiber in the main transmission line. Though the signals have a high strength when propagating through the first optical fiber having a positive chromatic dispersion, the occurrence of nonlinear optical phenomena is suppressed since the first optical fiber has a relatively large effective area of 40 $\mu m^2$ or greater. Since the signals lower their power while propagating through the first optical fiber, on the other hand, the signals having lowered their power propagates through the second optical fiber having a negative chromatic dispersion, thereby suppressing the occurrence of nonlinear optical phenomena in the second optical fiber as well. Further, since the whole optical fiber has a mean chromatic dispersion with a small absolute value and a small cumulative chromatic dispersion, the transmission quality is effectively restrained from deteriorating due to the cumulative chromatic dispersion.

In the optical fiber transmission line according to the present invention, the main transmission line may be a unitary optical fiber in which one or more positive dispersion portions having a positive chromatic dispersion at the predetermined wavelength and one or more negative dispersion portions having a negative chromatic dispersion at the predetermined wavelength are alternately disposed adjacent each other along the longitudinal direction thereof. In this case, signals alternately propagate through the positive and negative dispersion portions. Therefore, the occurrence of nonlinear optical phenomena (such as four-wave mixing in particular) is effectively suppressed if the absolute value of chromatic dispersion in each of the positive and negative dispersion portions is made greater. On the other hand the transmission quality is effectively restrained from deteriorating due to the cumulative chromatic dispersion if the absolute value of mean chromatic dispersion of the whole optical fiber transmission line is made smaller. Preferably, for effectively suppressing nonlinear optical phenomena, each of the positive and negative dispersion portions has a chromatic dispersion with an absolute value of 5 ps/nm/km or greater at the predetermined wavelength.

The optical cable according to the present invention comprises a plurality of transmission lines each having a structure similar to that of the optical fiber transmission line mentioned above. Here, this optical cable yields operations and effects similar to those of the above-mentioned optical fiber transmission line.

In the optical cable according to the present invention, the plurality of transmission lines comprise an upward transmission line group of N (>0) lines and a downward transmission line group of N (>0) lines having signal-advancing directions different from each other. Each of the optical fiber transmission lines included in the upstream transmission line group has a first identification marking, disposed at a portion located upstream in the signal-advancing direction thereof, for indicating that the portion is located on the upstream side and identifying the respective optical fiber transmission line, and a second identification marking, disposed at a portion located downstream in the signal-advancing direction thereof, for indicating that the portion is located on the downstream side and identifying the respective optical fiber transmission line. Each of the optical fiber transmission lines included in the downstream transmission line group has the first identification marking at a portion located upstream in the signal-advancing direction thereof, and the second identification marking disposed at a portion located downstream in the signal-advancing direction thereof.

Each of the first and second identification markings may be a colored layer disposed on a surface of the optical fiber transmission line or a mark applied to the optical fiber transmission line. When the optical fiber transmission lines included in the optical cable are thus provided with the first and second identification markings, rewinding operations in the process of connecting with repeater stations and the like become unnecessary, while facilitating the production control and restraining the operating cost from increasing. In particular, it is preferred that the first and second end sections be provided with the first and second identification markings, respectively, from the viewpoint of enhancing the efficiency in the operation of laying the optical cable.

Preferably, the optical cable according to the present invention comprises a third identification marking for indicating the directivity of each optical fiber transmission line (indicative of the signal-advancing direction), i.e., the laying direction of the optical cable. Here, the third identification marking may be a colored layer or a label applied to the optical fiber unit. In this case, optical fiber transmission lines can be distinguished from each other at each point. Preferably, a part of the optical cable excluding the optical fiber transmission lines, e.g., an optical fiber unit accommodating the optical fiber transmission lines therein, is provided with the third identification marking.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 1A is a view showing the cross-sectional structure of a submarine optical cable, whereas

FIGS. 2A to 2D are views for explaining respective steps of making an optical cable;

FIG. 3A is a view showing the configuration of a first embodiment of the optical transmission line according to the present invention, whereas FIG. 3B is a chart showing the chromatic dispersion of individual parts in the optical fiber transmission,line according to the first embodiment along a longitudinal direction thereof;

FIG. 6A is a view showing, a state of assembly of optical fiber transmission lines constituting a first embodiment of the optical cable according to the present invention, whereas

FIG. 7A is a view showing the configuration of a second embodiment of the optical fiber transmission line according to the present invention, whereas FIG. 7B is a chart showing the chromatic dispersion of individual parts in the optical fiber transmission line according to the second embodiment along a longitudinal direction thereof;

FIG. 9A is a view showing a state of assembly of optical fiber transmission lines partly constituting a third embodiment of the optical cable according to the present invention, whereas FIGS. 9B and 9C are views showing colored layers as identification markings provided in each of the optical fiber transmission lines shown in FIG. 9A;

FIG. 10A is a view showing a state of assembly of optical fiber transmission lines partly constituting an optical cable which is a comparative example, whereas FIG. 11A is a view showing a partial configuration of a fourth embodiment of the optical cable according to the present invention, FIGS. 11B and 11C are views showing colored layers as identification markings provided in each of the optical fiber transmission lines shown in FIG. 11A, and FIG. 11D is a view showing a colored layer as an identification marking provided in the optical cable shown in FIG. 11A.

DESCRIPTION OF THE PREFERRED EMBODIMENTS

In the following, embodiments of the optical fiber transmission line according to the present invention and the optical cable including the same will be explained with reference to FIGS. 3A, 3B, 4, 5, 6A to 7B, 8, and 9A to 11B. In the explanation of the drawings, constituents identical to each other will be referred to with numerals or letters identical to each other without repeating their overlapping descriptions. Also, FIGS. 1A to 2D will be cited whenever necessary.

First Embodiment of Optical Fiber Transmission Line

Figure 1A:
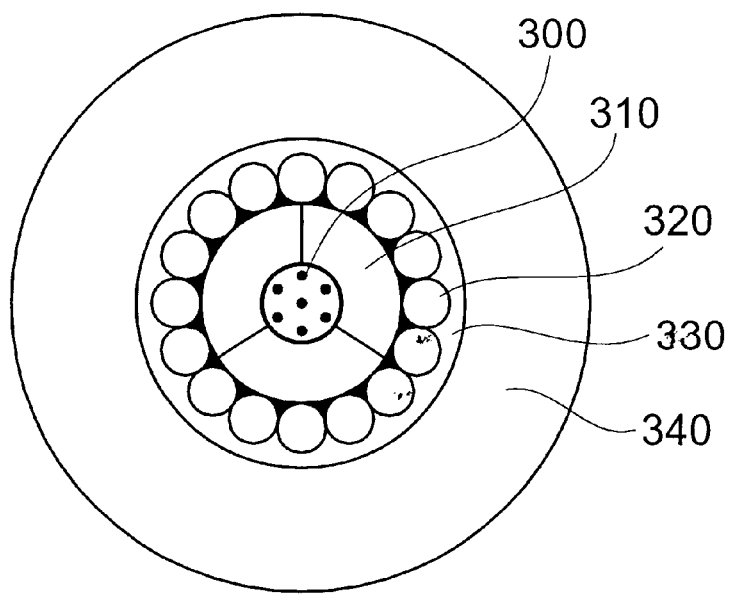
Figure 1B:
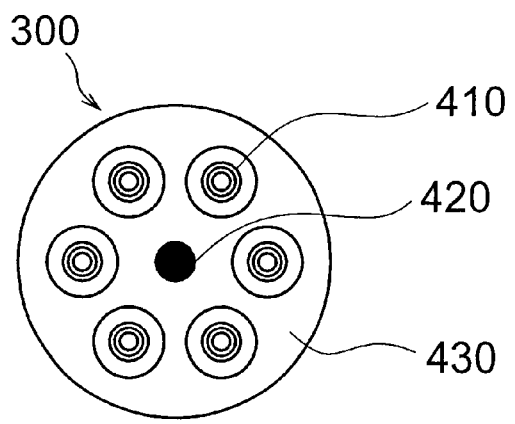
FIG. 1B is a view showing the cross-sectional structure of the optical fiber unit included in the submarine optical cable.
Figures 3A, 3B:
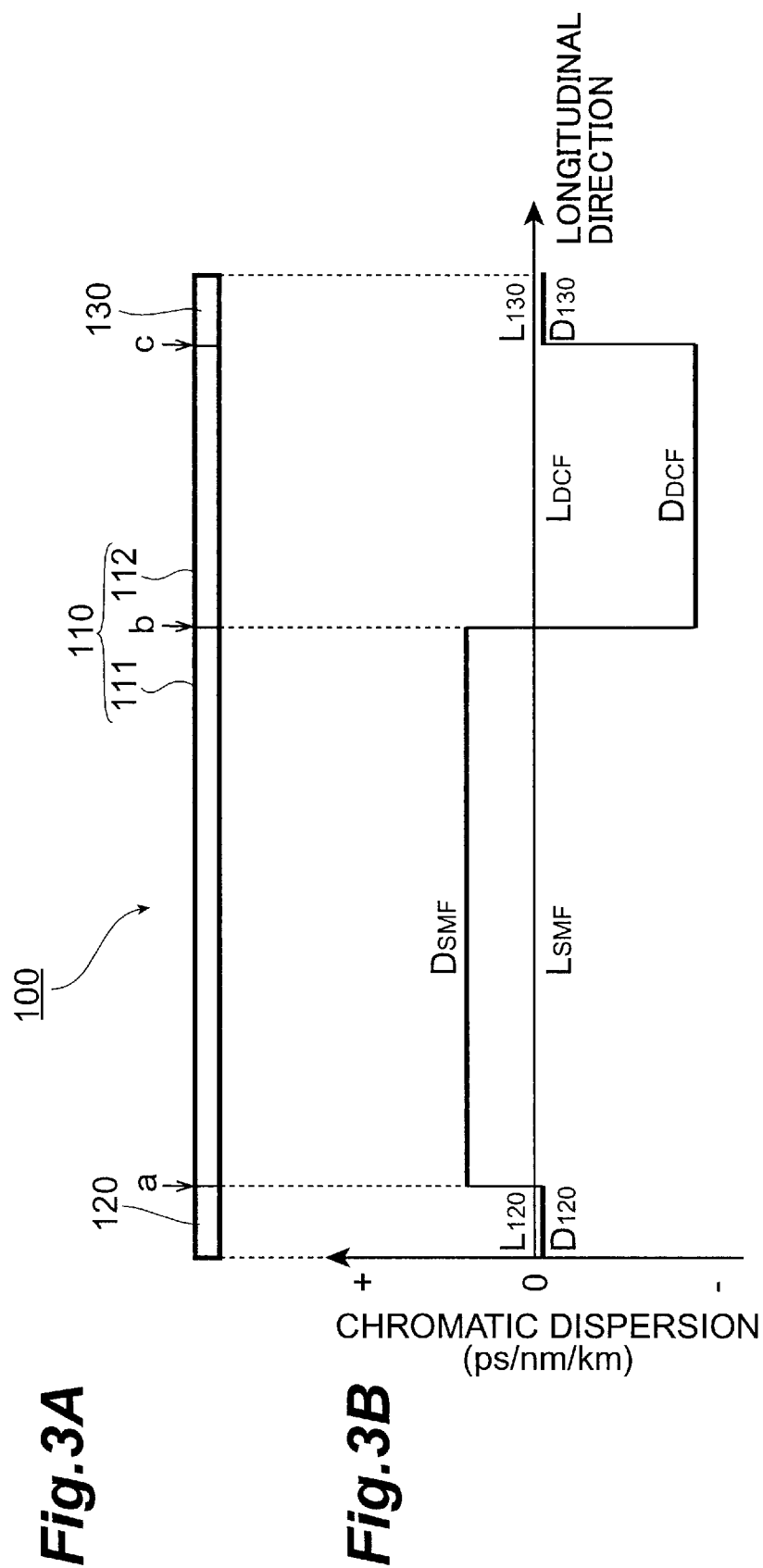

FIG. 3A is a view showing the configuration of a first embodiment of the optical transmission line according to the present invention whereas FIG. 3B is a chart showing the chromatic dispersion of individual parts in the optical fiber transmission line according to the first embodiment along a longitudinal direction thereof.

Figure 4:
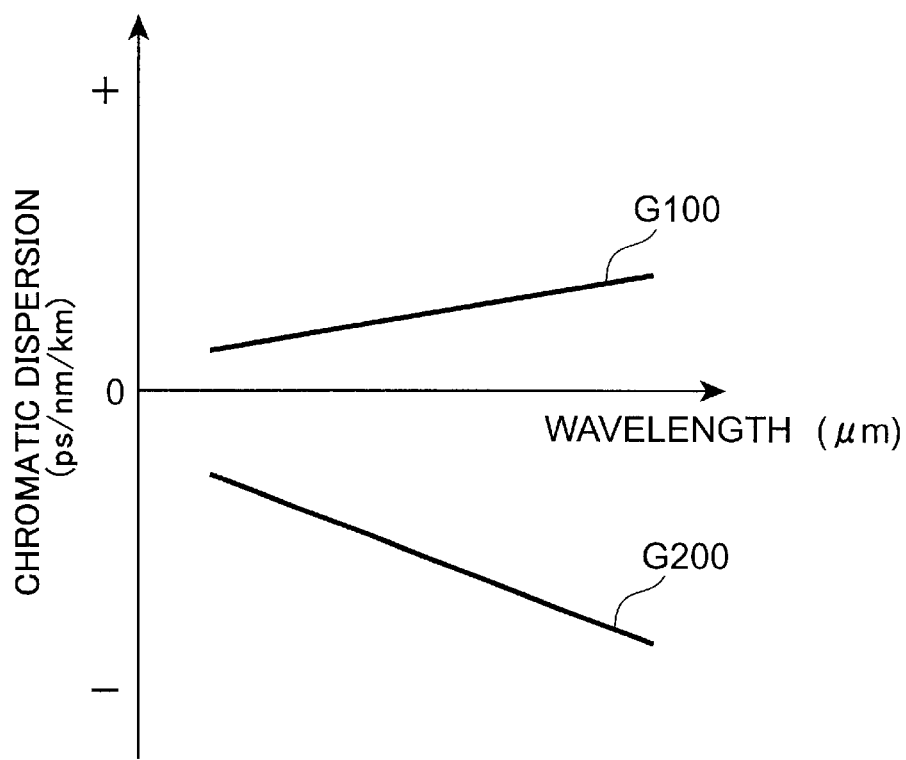
FIG. 4 is a graph showing respective chromatic dispersion characteristics of a single-mode optical fiber and a dispersion-compensating optical fiber which constitute the optical fiber transmission line according to the first embodiment shown in FIGS. 3A and 3B.

The optical fiber transmission line 100 according to the first embodiment comprises a main transmission line 110 whose transmission characteristic changes along its longitudinal direction, and a first end section 120 and a second end section 130 which are fusion-spliced to both ends of the main transmission line 110, respectively. The main transmission line 110 comprises a single-mode optical fiber 111 (an optical fiber having a positive chromatic dispersion) and a dispersion-compensating optical fiber (an optical fiber having a negative chromatic dispersion) 112 which are successively disposed along the signal-advancing direction. FIG. 4 is a graph showing respective chromatic dispersion characteristics of the single-mode optical fiber 111 and dispersion-compensating optical fiber 112, in which curves G100 and G200 indicate the chromatic dispersion characteristics of the single-mode optical fiber 111 and dispersion-compensating optical fiber 112, respectively.

The single-mode optical fiber 111 has a zero-dispersion wavelength near a wavelength of 1.3 µm, a positive chromatic dispersion of about 17 to 20 ps/nm/km at a wavelength of 1.55 µm, and a positive dispersion slope at the wavelength of 1.55 µm; The single-mode optical fiber 111 is an optical fiber, mainly composed of silica glass, having a core doped with $GeO_2$; or an optical fiber having a core constituted by pure silica and a cladding doped with F element. In particular, the case where the single-mode optical fiber 111 is the latter optical fiber (having a core made of pure silica and a cladding made of F-doped silica) is suitable for submarine optical cables and the like, since it has a low transmission loss and is excellent in hydrogen resistance characteristics and radiation resistance characteristics. Preferably, for effectively restraining nonlinear optical phenomena from occurring, the single-mode optical fiber 111 has an effective area of at least 40 µm².

On the other hand, the dispersion-compensating optical fiber 112 is an optical fiber having a negative chromatic dispersion with an absolute value of several tens of ps/nm/ km at a wavelength of 1.55 µm and a negative dispersion slope at the wavelength of 1.55 µm.

In the main transmission line 110 constituted by the single-mode optical fiber 111 and dispersion-compensating optical fiber 112 fusion-spliced to each other, chromatic dispersion changes along its longitudinal direction as shown in FIG. 3B. Letting $D_{SMF}$ be the chromatic dispersion of the single-mode optical fiber 111, $L_{SMF}$ be the length thereof, $D_{DCF}$ be the chromatic dispersion of the dispersion-compensating optical fiber 112, and $L_{DCF}$ be the length thereof, the mean chromatic dispersion $D_{mean}$ of the main transmission line 110 as a whole is represented by the following expression:

$$D_{mean} = (D_{SMF} \cdot L_{SMF} + D_{DCF} \cdot L_{DCF})/(L_{SMF} + L_{DCF})$$

In the optical fiber transmission line 100 according to the first embodiment, the chromatic dispersion $D_{SMF}$ and length $L_{SMF}$ of the single-mode optical fiber 111 and the chromatic dispersion $D_{DCF}$ and length $L_{DCF}$ of the dispersion-compensating optical fiber 112 are appropriately set so as to lower the absolute value of mean chromatic dispersion $D_{mean}$. Of the main transmission line 110. Preferably, the absolute value of mean chromatic dispersion $D_{mean}$ of the main transmission line 110 is 5 ps/nm/km or less.

The first end section 120 is fusion-spliced to one end of the single-mode optical fiber 111 and has a chromatic dispersion $D_{120}$ which is substantially equal to the mean chromatic dispersion $D_{mean}$ of the main transmission line 110. On the other hand, the second end section 130 is fusion-spliced to one end of the dispersion-compensating optical fiber 112 and has a chromatic dispersion $D_{130}$ which is substantially equal to the mean chromatic dispersion $D_{mean}$ of the main transmission line 110. Each of the chromatic dispersion $D_{120}$ of the first end section 120 and the chromatic dispersion $D_{130}$ of the second end section 130 is a substantially constant value along the longitudinal direction of the main transmission line 110, preferably having an absolute value of 5 ps/nm/km or less. It is preferred that each of such first and second end sections 120, 130 is a dispersion-shifted optical fiber having a zero-dispersion wavelength near a wavelength of 1.55 µm. Preferably, each of the length $L_{120}$ of the first end section 120 and the length $L_{130}$ of the second end section 130 is 5% or less with respect to the whole optical fiber transmission line 100, specifically 1000 m or less.

Thus, in the optical fiber 100 according to the first embodiment, the first end section 120, single-mode optical fiber 111, dispersion-compensating optical fiber 112, and second end section 130 are successively disposed along the signal-advancing direction. Since each of the chromatic dispersion in the first end section 120 and the chromatic dispersion in the second end section 130 is set so as to become substantially identical to the mean chromatic dispersion in the main transmission line 110, the mean chromatic dispersion of the whole optical fiber transmission line 100 substantially equals the mean chromatic dispersion in the main transmission line 110.

In the optical fiber transmission line 100, signals reach the single-mode optical fiber 111 after propagating through the first end section 120. Though the signals have a high strength while propagating through the single-mode optical fiber 111, nonlinear optical phenomena are restrained from occurring in the single-mode optical fiber 111 since the single-mode optical fiber 111 has a relatively large effective area. Further, the signals lower their power while propagating through the single-mode optical fiber 111, whereby the signals having lowered their power would propagate through the dispersion-compensating optical fiber 112. As a consequence, the occurrence of nonlinear optical phenomena in the dispersion-compensating optical fiber 112 is suppressed. Then, the signals propagate through the second end section 130 after passing through the dispersion-compensating optical fiber 112. Since the optical fiber transmission line 100 as a whole yields a mean chromatic dispersion with a small absolute value and a small cumulative chromatic dispersion, the transmission quality is effectively restrained from deteriorating due to the cumulative chromatic dispersion. Further, since the respective dispersion slopes of the single-mode optical fiber 111 and dispersion-compensating optical fiber 112 have polarities different from each other, the main transmission line 110 can keep the cumulative chromatic dispersion low in a wider wavelength range.

Effects of the optical fiber transmission line according to the first embodiment will now be explained with reference td specific values. Here, it is assumed that the chromatic dispersion of the single-mode optical fiber 111 at a wavelength of 1.55 μm is 20 ps/nm/km, and the chromatic dispersion of the dispersion compensating optical fiber 112 at a wavelength of 1.55 μm is −46 ps/nm/km. Also, the target length of the final optical fiber transmission line 100 is set to 50 km. Here, the length ($L_{SMF}+L_{DCF}$) of the main transmission line 110 is set to 49 km, so as to becomes lightly shorter than the target length of optical fiber transmission line 100.

Then, let the length $L_{SMF}$ of single-mode optical fiber 111 be 32.5 km, and the length $L_{DCF}$ of dispersion-compensating optical fiber 112 be 16.5 km, so that the absolute value of mean chromatic dispersion $D_{mean}$ in the main transmission line 110 becomes substantially zero. Employed as each of the first and second end section 120, 130 is a dispersion-shifted optical fiber having a chromatic dispersion of =2 ps/nm/km at a wavelength of 1.55 μm, and a length of 1 km.

In thus configured optical fiber transmission line 100, the cut length for the first end section 120 (the length by which the first end section 120 is cut off) is set to 200 m, and the cut length for the second end section 130 is set to 700 m. Then, the amount of change in cumulative chromatic dispersion in the whole optical fiber transmission line 100 caused by the cutting of the first and second end sections 120, 130 is −1.8 ps/nm (=−2×0.2+(−2)×0.7).

As a comparative example an optical fiber transmission line having a length of 51 km constituted by only a single-mode optical fiber and a dispersion-compensating optical fiber without providing the first end section 120 and second end section 130 will be studied. In the case where the cut length in the end portion of the single-mode optical fiber is 200 m while the cut length in the end portion of the dispersion-compensating optical fiber is 700 m, the amount of change in cumulative chromatic dispersion in the whole optical fiber transmission line of comparative example caused by the cutting of the end portions is −28.2 ps/nm (=20× 0.2+(−46)×0.7).

As long as the cutting is effected in the first end section 120 or second end section 130 having a chromatic dispersion substantially equal to the mean chromatic dispersion (which is substantially zero) in the main transmission line 110, the mean chromatic dispersion of the optical fiber transmission line 100 changes little between before and after the cutting, and the change in its cumulative chromatic dispersion is also small. Therefore, if the main transmission line 110 is designed so as to have a desirable mean transmission characteristic in the optical fiber transmission line 100 according to the first embodiment, then the optical fiber transmission line 100 as a whole maintains the desirable mean transmission characteristic even when its total length is altered as both ends thereof are partly cut off, whereby a WDM transmission system having desirable design values can easily be constructed. Here, if each of the first and second end sections 120, 130 has a length of 1 km, it will be sufficient as the length to be cut at the time of making a cable.

When the optical fiber transmission line 100 is laid in a repeating section, the first and second end sections 120, 130 are each connected to a repeater station 500. Since the repeater station 500 is provided with an optical amplifier 510 and the like, the first and second end sections 120, 130 are connected to pigtail optical fibers 520 extending from the optical amplifier 510 in practice. Therefore, each of the first and second end sections 120, 130 preferably has a mode field diameter substantially identical to the mode field diameter of the respective pigtail fiber 520, extending from the optical amplifier 510 to connect therewith, for guiding signals to the optical amplifier 510.

First Embodiment of Optical Cable

Figure 6A:
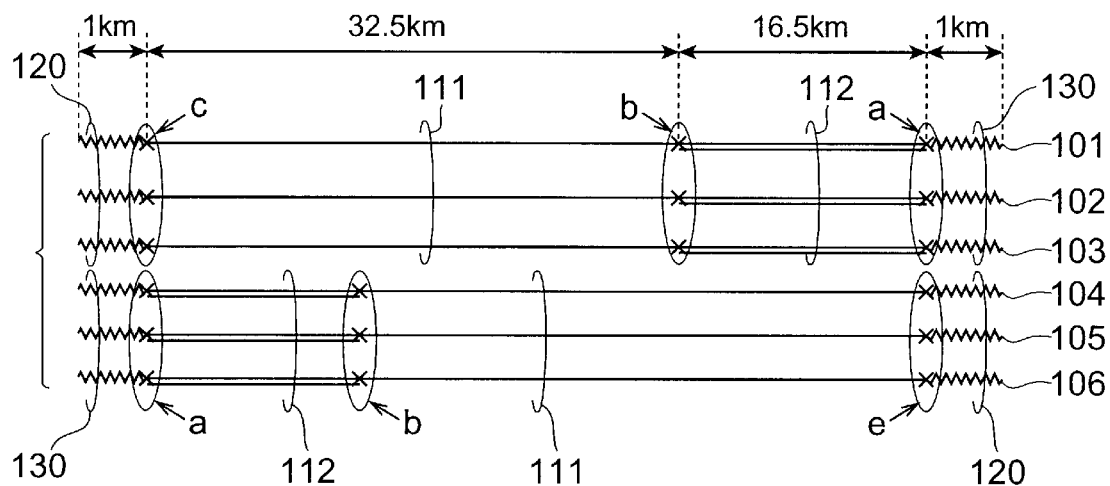
Figure 6B:
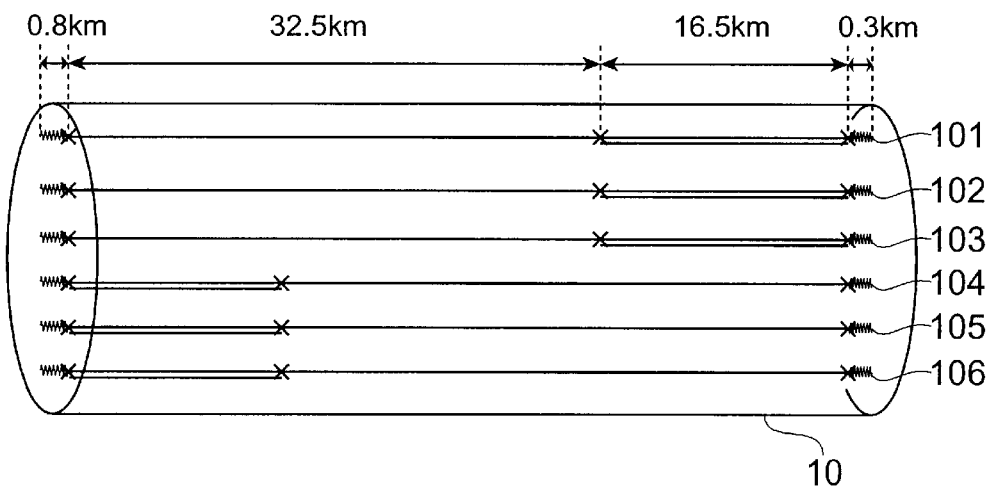
FIG. 6B is a view showing a partial configuration of the first embodiment of the optical cable according to the present invention obtained from a plurality of optical fiber transmission lines shown in FIG. 6A.

An optical cable 10 including a plurality of transmission lines each having the same structure as the optical fiber transmission line 100 according to the first embodiment will now be explained. FIG. 6A is a view showing a state of assembly of optical fiber transmission lines constituting a first embodiment of the optical cable according to the present invention, whereas FIG. 6B is a view showing a partial configuration of the first embodiment of the optical cable according to the present invention obtained from a plurality of optical fiber transmission lines shown in FIG. 6A. Here, FIG. 6B shows only the part corresponding to the optical fiber unit 300 shown in FIG. 1B.

The optical cable 10 is constituted by three upward optical fiber transmission lines 101 to 103 and three downward optical fiber transmission lines 104 to 106. Each of the optical fiber transmission lines 101 to 106 has a structure identical to that of the optical fiber transmission line 100 according to the first embodiment shown in FIGS. 3A and 3B. In each of the optical fiber transmission lines 101 to 103 in FIG. 6A, the single-mode optical fiber 111 (SMF) and dispersion-compensating optical fiber 112 (DCF) are disposed on the upstream and downstream sides in the signal-advancing direction, respectively. In each of the optical fiber transmission lines 104 to 106, by contrast, the dispersion-compensating optical fiber 112 (DCF) and single-mode optical fiber 111 (SMF) are disposed on the upstream and downstream sides in the signal-advancing direction, respectively. In each of the six optical fiber transmission lines 101 to 106, the chromatic dispersion of single-mode optical fiber 111 at a wavelength of 1.55 μm is set to 20 ps/nm/km, whereas the chromatic dispersion of dispersion-compensating optical fiber 112 at a wavelength of 1.55 μm is set to −46 ps/nm/km. Also, the target length of the final optical cable 10 is set to 50 km. Here, the length ($L_{SMF}+L_{DCF}$) of the main transmission line 110 in each of the optical fiber transmission lines 101 to 106 is set to 49 km, so as to become slightly shorter than the target length of optical cable 10.

Then, in each of the optical fiber transmission lines 101 to 106, let the length $L_{SMF}$ of single-mode optical fiber 111 be 32.5 km, and the length $L_{DCF}$ of dispersion-compensating optical fiber 112 be 16.5 km, so that the absolute value of mean chromatic dispersion $D_{mean}$ in the main transmission line 110 becomes substantially zero. Employed as each of the first and second end sections 120, 130 is a dispersion-shifted optical fiber having a chromatic dispersion of −2 ps/nm/km at a wavelength of 1.55 μm, and a length of 1 km.

Thus configured optical fiber transmission lines 101 to 106 are bundled, so as to make the optical cable 10. In the process of making the optical cable 10, the cut length at one end of each of the optical fiber transmission lines 101 to 104 is set to 200 m, and the cut length at the other end is set to 700 m. Since the first and second end sections 120, 130 are partly cut off in each of the optical fiber transmission lines 101 to 106 in the optical cable 10 according to the first embodiment, the amount of change in cumulative chromatic dispersion in each of the optical fiber transmission lines 101 to 106 caused by the cutting is −1.8 ps/nm (=−2×0.2+(−2)× 0.7).

As a comparative example, an optical cable including a fiber transmission line having a length of 51 km constituted by only a single-mode optical fiber and a dispersion-compensating optical fiber without providing the first and second end sections 120, 130 will be considered. The cut length at one end of the optical fiber transmission line is set to 200 m while the cut length at the other end is set to 700 m in the optical cable of comparative example as well. In the optical cable of comparative example, the amount of change in cumulative chromatic dispersion in the whole optical fiber transmission line varies depending on whether the optical fiber transmission line is an upward optical fiber transmission line or downward optical fiber transmission line, i.e., whether the single-mode optical fiber or dispersion-compensating optical fiber has a longer cut length. Letting the cut length for the single-mode optical fiber be 200 m, and the cut length for the dispersion-compensating optical fiber be 700 m, the amount of change in cumulative chromatic dispersion in the whole optical fiber transmission line caused by the cutting is −28.2 ps/nm (=20×0.2+(−46)×0.7). On the other hand, letting the cut length for the single-mode optical fiber be 700 m, and,the cut length for the dispersion-compensating optical fiber be 200 m, the amount of change in cumulative chromatic dispersion in the whole optical fiber transmission line caused by the cutting is −4.8 ps/nm (=−46× 0.2+20×0.7).

In the optical cable of comparative example, the cumulative chromatic dispersion of each optical fiber transmission line changes greatly upon cabling, and its amount of change differs between the upward and downward optical fiber transmission lines. It is because of the fact that each of the single-mode optical fiber and dispersion-compensating optical fiber has a chromatic dispersion with a large absolute value, and the ratio of their absolute values of chromatic dispersions is not 1:1 but 1:N. In general, the amount of change in cumulative chromatic dispersion becomes greater between the upward and downward optical fiber transmission lines as the difference between cut lengths at both ends of optical fiber transmission line is greater in the case where the value of N is large. Even when the cut lengths at both ends are equal to each other, the amount of change in cumulative chromatic dispersion becomes greater between the upward and downward optical transmission lines as the value of N is greater.

In the optical cable 10 according to the first embodiment, by contrast, the first and second end sections 120, 130 each having a chromatic dispersion substantially identical to the mean chromatic dispersion (which is substantially zero) in the main transmission line 110 are partly cut off, whereby the mean chromatic dispersion in each of the optical fiber transmission lines 101 to 106 changes little between before and after the cutting, and the change in its cumulative chromatic dispersion is also small. Therefore, if the main transmission line 110 in each of the optical fiber transmission lines 101 to 106 is designed so as to have a desirable mean transmission characteristic in the optical cable 10, then the desirable mean transmission characteristic is maintained as a whole even when both ends thereof are partly cut off, whereby a WDM transmission system having desirable design values can easily be constructed. Here, if each of the first and second end sections 120, 130 has a length of 1 km in each of the optical fiber transmission lines 101 to 106, it will be sufficient as the length to be cut at the time of making a cable.

If the respective lengths of the single-mode optical fiber 111 and dispersion-compensating optical fiber 112 in the main transmission line 110 are appropriately adjusted beforehand in view of the respective lengths of first and second end sections 120, 130 remaining after the end portion cutting and the chromatic dispersion caused thereby in each of the optical fiber transmission line 100 and the optical fiber transmission lines 101 to 106 included in the optical cable 10, then the chromatic dispersion of the finally obtained optical fiber transmission line as a whole can be made closer to its desirable design value.

Figure 5:
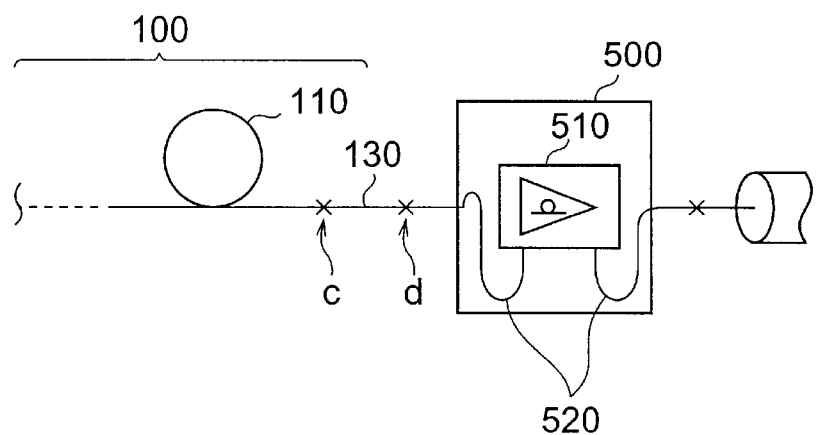
FIG. 5 is a view for explaining a state of connection between the optical fiber transmission line according to the present invention and a repeater station.

Preferably, taking account of the case being connected to another optical fiber (e.g. a pigtail fiber 520 extending from an optical amplifier 510 provided in a repeater station 500 as shown in FIG. 5), each of the first and second end sections 120, 130 in the optical fiber transmission line 100 and the optical fiber transmission lines 101 to 106 in the optical cable 10 has a mode field diameter substantially equal to the mode field diameter of the optical fiber 520. Such a configuration effectively restrains the splice loss at the junction between the optical fiber transmission line 100 and repeater station 500 from increasing.

The single-mode optical fiber 111 may be a unitary optical fiber or an optical fiber constituted by a plurality of optical fibers fusion-spliced to each other. Similarly, each of the dispersion-compensating optical fiber 112 first end section 120, and second end section 130 may be constituted by a plurality of constituents (optical fibers).

Second Embodiment of Optical Fiber Transmission Line

Figure 8:
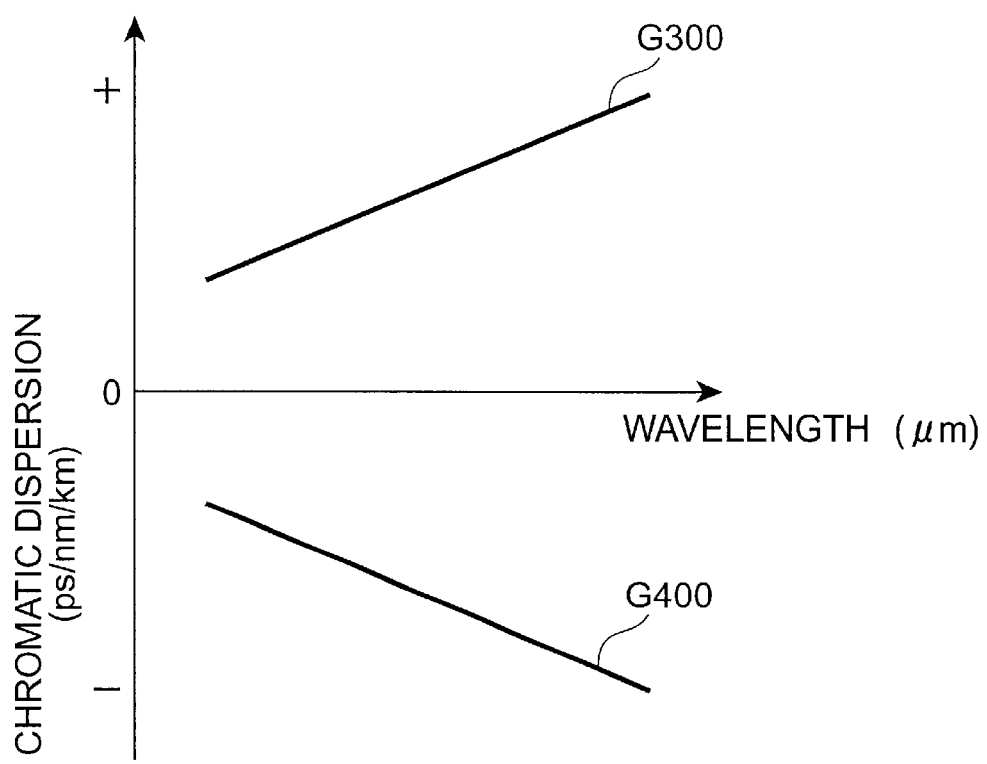
FIG. 8 is a graph showing respective chromatic dispersion characteristics of positive and negative dispersion portions which constitute the optical fiber transmission line according to the second embodiment shown in FIGS. 7A and 7B.

A second embodiment of the optical fiber transmission line according to the present invention will now be explained. FIG. 7A is a view showing the configuration of a second embodiment of the optical fiber transmission line according to the present invention, whereas FIG. 7B is a chart showing the chromatic dispersion of individual parts in the optical fiber transmission line according to the second embodiment along a longitudinal direction thereof. On the other hand, FIG. 8 is a graph showing the chromatic dispersion characteristic in the optical fiber transmission line according to the second embodiment shown in FIGS. 7A and 7B, in which curves G300 and G400 indicate respective chromatic dispersion characteristics in positive and negative dispersion portions 211, 212, respectively.

The optical fiber 200 comprises a main transmission line 210, and a first end section 220 and a second end section 230 which are fusion-spliced to both ends of the main transmission line 210, respectively. The main transmission line 210 is a unitary optical fiber in which one or more positive dispersion portions 211 each having a positive chromatic dispersion and one or more negative dispersion portions 212 each having a negative chromatic dispersion are alternately disposed along the signal-advancing direction.

At a signal wavelength (e.g., a wavelength of 1.55 $\mu$m), the positive dispersion portions 211 have a positive chromatic dispersion $D_{211}$, whereas the negative dispersion portions 212 have a negative chromatic dispersion $D_{212}$. Preferably, each of the positive chromatic dispersion $D_{211}$ of positive dispersion portions 211 and the negative chromatic dispersion $D_{212}$ of negative dispersion portions 212 has an absolute value of at least 5 ps/nm/km or, for example, on the order of 5 ps/nm/km to 50 ps/nm/km. Each of the positive and negative dispersion portions 211, 212 has a length on the order of several km to several tens of km, for example. Preferably, at the signal wavelength, the positive dispersion portions 211 have a positive dispersion slope, whereas the negative dispersion portions 212 have a negative dispersion slope.

In the main transmission line 210 in which the positive and negative dispersion portions 211, 212 are alternately disposed along the signal-advancing direction, the polarity of chromatic dispersion thus changes in the longitudinal direction. The mean chromatic dispersion $D_{mean}$ of the main transmission line 210 is given when the weighted mean of the chromatic dispersion $D_{211}$ of positive dispersion portions 211 and the chromatic dispersion $D_{212}$ of negative dispersion portions 212 with respect to their respective lengths is obtained. In the optical fiber transmission line 200 according to the second embodiment, the chromatic dispersion $D_{211}$ of positive dispersion portions 211 and the sum of their lengths, and the chromatic dispersion $D_{212}$ of negative dispersion portions 212 and the sum of their lengths are appropriately set so as to lower the absolute value of mean chromatic dispersion $D_{mean}$ in the main transmission line 210. Preferably, the main transmission line 210 has a mean chromatic dispersion $D_{mean}$ with an absolute value of 5 ps/nm/km or less.

The first end section 220 is fusion-spliced to one end of the main transmission line 210 and has a chromatic dispersion $D_{220}$ substantially equal to the mean chromatic dispersion $D_{mean}$ of the main transmission line 210. On the other hand, the second end section 230 is fusion-spliced to the other end of the main transmission line 210 and has a chromatic dispersion $D_{230}$ substantially equal to the mean chromatic dispersion $D_{mean}$ of the main transmission line 210. Each of the chromatic dispersion $D_{220}$ of first end section 220 and the chromatic dispersion $D_{230}$ of second end section 230 is a value substantially constant in the longitudinal direction, and is preferably 5 ps/nm/km or less. Preferably, each of such first and second end sections 220, 230 is a dispersion-shifted optical fiber having a zero-dispersion wavelength near a wavelength of 1.55 μm. It is preferred that each of the length $L_{220}$ of first end section 220 and the length $L_{230}$ of second end section 230 be 5or less with respect to the total length of the whole optical fiber transmission line 200, specifically 1000 m or less.

Thus, in the optical fiber 200 according to the second embodiment, the first end section 220, main transmission line 210, and second end section 230 are successively disposed. Since each of the chromatic dispersion in the first and second end sections 220, 230 is substantially the same as the mean chromatic dispersion in the main transmission line 210, the mean chromatic dispersion of the whole optical fiber transmission line 200 substantially equals the mean chromatic dispersion in the main transmission line 210.

In the optical fiber transmission line 200, the signals inputted from the light input end of the first end section 220 successively propagate through the first end section 220, main transmission line 210, and second end section 230, so as to be outputted from the light output end of the second end section 230. In the main transmission line 210, since the absolute value of chromatic dispersion in each of the positive and negative dispersion portions 211, 212 is large, nonlinear optical phenomena are restrained from occurring. Further, since the mean chromatic dispersion is small as a whole, waveform is restrained from deteriorating due to cumulative chromatic dispersion, whereby an excellent transmission quality is obtained. Also, since the respective dispersion slopes of the positive and negative dispersion portions 211, 212 have polarities different from each other, cumulative chromatic dispersion is kept low in a wide wavelength range in the main transmission line 210.

As in the optical fiber transmission line 100 according to the first embodiment, if the target length of the final optical fiber transmission line 200 is 50 km in the optical fiber transmission line 200 according to the second embodiment, the length of main transmission line 210 is set to 49 km so as to become slightly shorter than the target length of the optical fiber transmission line 200 as a whole. Then, the respective lengths of positive and negative dispersion portions 211, 212 are adjusted appropriately, such that the absolute value of mean chromatic dispersion $D_{mean}$ of main transmission line 210 becomes substantially zero. Suitable as each of the first and second end sections 220, 230 is a dispersion-shifted optical fiber having a chromatic dispersion of −2 ps/nm/km at a wavelength of 1.55 μm, for example, and a length of 1 km.

As a comparative example, a unitary optical fiber transmission line having a length of 51 km in which positive and negative dispersion portions are alternately disposed along the signal-advancing direction without providing the first and second end sections 220, 230 will be considered. Partly cutting both ends in the optical fiber transmission line of comparative example means that positive and negative dispersion portions are partly cut off. Since the absolute value of chromatic dispersion in each of the positive and negative dispersion portions is set to a large value in order to obtain a favorable transmission characteristic, however, the mean chromatic dispersion of the whole optical fiber transmission line greatly changes when they are partly cut off.

In the optical fiber transmission line 200 according to the second embodiment, by contrast, since the first and second end sections 220, 230 each having a chromatic dispersion substantially equal to the mean chromatic dispersion (which is substantially zero) in the main transmission line 210 are partly cut off, the mean chromatic dispersion of the optical fiber transmission line 200 as a whole changes little between before and after the cutting, and the change in its cumulative chromatic dispersion is also small. Therefore, if the main transmission line 210 has a desirable mean transmission characteristic, then the optical fiber transmission line 200 maintains the preset mean transmission characteristic even when its end portions are partly cut off, whereby a WDM transmission system having desirable design values can easily be constructed. Here, if each of the first and second end sections 220, 230 has a length of 1 km, it will be sufficient as the length to be cut at the time of making a cable.

Second Embodiment of Optical Cable

A second embodiment of the optical cable according to the present invention includes a plurality of transmission lines each having a structure identical to that of the optical fiber transmission line 200 having the above-mentioned structure. The optical cable according to the second embodiment has a structure similar to that of the optical cable 10 shown in FIG. 6B. Namely, in this optical cable, each of the optical fiber transmission lines 101 to 106 in FIG. 6B is constituted by the optical fiber transmission line 200 shown in FIG. 9A.

If the final target length of this optical cable is 50 km, the length of main transmission line 210 in each optical fiber transmission line 200 to be bundled is set to 49 km so as to become slightly shorter than the target length of optical cable. Then, the respective lengths of positive and negative dispersion portions 211, 212 are appropriately adjusted, such that the absolute value of mean chromatic dispersion $D_{mean}$ in the main transmission line 210 becomes substantially zero. Employed as each of the first and second end sections 220 and 230 is a dispersion-shifted optical fiber having a chromatic dispersion of −2 ps/nm/km at a wavelength of 1.55 μm, for example, and a length of 1 km.

As a comparative example, an optical cable including a unitary optical fiber transmission line having a length of 51 km in which positive and negative dispersion portions are alternately disposed along the signal-advancing direction without providing the first and second end sections 220, 230 will be considered.

Partly cutting both ends in the optical cable of comparative example means that positive and negative dispersion portions are partly cut off. Since the absolute value of chromatic dispersion in each of the positive and negative dispersion portions is set to a large value in order to obtain a favorable transmission characteristic, however, the mean chromatic dispersion of the whole optical fiber transmission line greatly changes when they are partly cut off. Since it is uncertain which part of the positive and negative dispersion portions is cut off, it cannot be estimated at all whether the fluctuation of mean chromatic dispersion shifts in the positive or negative direction. Also, the amount of change in mean chromatic dispersion caused by the end portion cutting may differ among the plurality of optical fiber transmission lines included in the optical cable.

In the optical cable according to the second embodiment, by contrast, since the first and second end sections 220, 230 each having a chromatic dispersion substantially equal to the mean chromatic dispersion (which is substantially zero) in the main transmission line 210 are partly cut off, the mean chromatic dispersion of the optical fiber transmission line 200 changes little between before and after the cutting, and the change in its cumulative chromatic dispersion is also small. Therefore, if the main transmission line 210 in each optical fiber transmission line 200 is designed so as to have a desirable mean transmission characteristic, then the optical cable maintains the preset mean transmission characteristic even when its end portions are partly cut off, whereby a WDM transmission system having desirable design values can easily be constructed. Here, if each of the first and second end sections 220, 230 has a length of 1 km in each optical fiber transmission line 200, it will be sufficient as the length to be cut at the time of making a cable.

In each of the optical fiber transmission line 200 and the optical fiber transmission lines in the optical cable, if the respective chromatic dispersions and lengths of the positive and negative dispersion portions 211, 212 in the main transmission line 210 are appropriately set beforehand in view of the respective lengths of first and second end sections 220, 230 remaining after being partly cut off and the respective chromatic dispersions of first and second end sections 220, 230, then the chromatic dispersion of the finally obtained optical fiber transmission line as a whole can be made closer to its desirable design value.

Preferably, taking account of the case being connected to another optical fiber (e.g. a pigtail fiber 520 extending from an optical amplifier 510 provided in a repeater station 500 as shown in FIG. 5), each of the first and second end sections 220, 230 in each of the optical fiber transmission line 200 and the optical fiber transmission lines in the optical cable has a mode field diameter substantially equal to the mode field diameter of the optical fiber 520. Such a configuration effectively restrains the splice loss at the junction between the optical fiber transmission line 200 and repeater station 500 from increasing.

Here, a unitary optical fiber in which polarities of chromatic dispersion alternate along the signal-advancing direction, employed in the main transmission line 210, is obtained by the method shown in U.S. Pat. No. 5,894,537, for example. Specifically, it is obtained when, while in an optical fiber preform, the fiber diameter and core diameter are changed in the longitudinal direction or the tension is changed so as to cause the stress remaining in the core to change in the longitudinal direction.

Third Embodiment of Optical Cable

A third embodiment of the optical cable according to the present invention will now be explained. FIG. 9A is a view showing a state of assembly of optical fiber transmission lines No. 1 to No. 6 partly constituting the optical cable 30 according to the third embodiment, whereas FIGS. 9B and 9C are views showing colored layers as identification markings provided in each of the optical fiber transmission lines No. 1 to No. 6 shown in FIG. 9A.

Figure 10A:
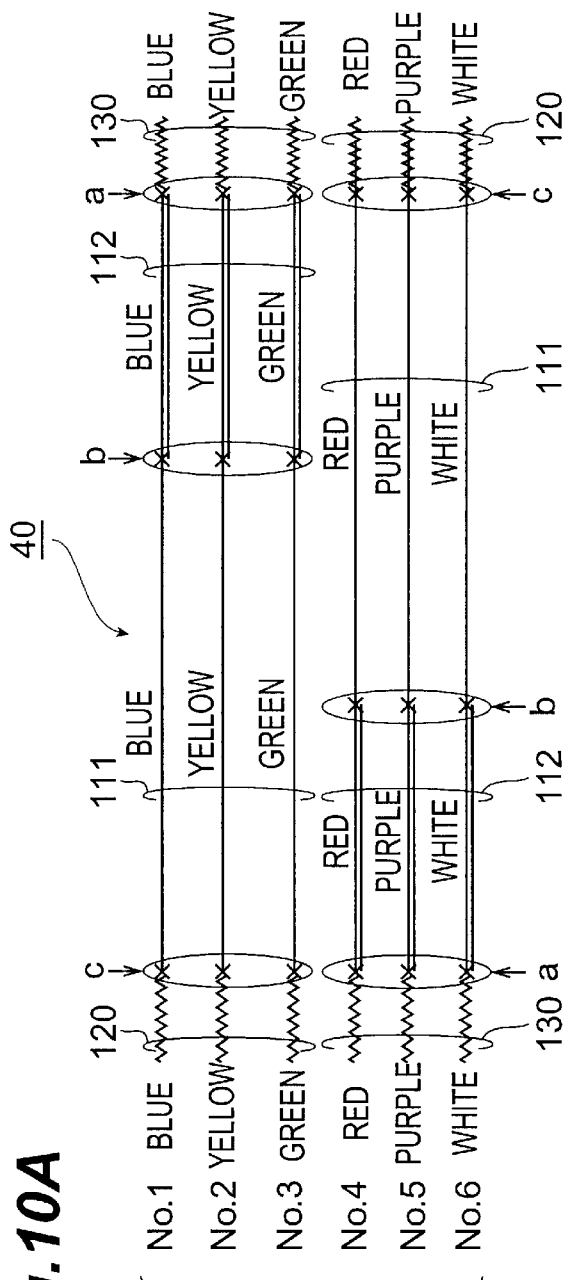
Figure 10B:
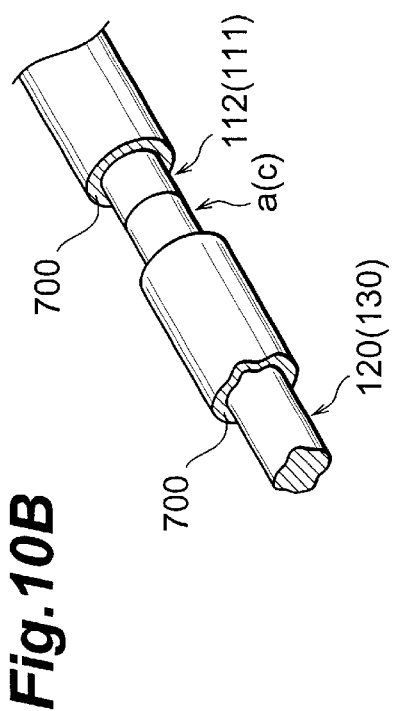
FIGS. 10B is a view showing a colored layer as an identification marking provided in each of the optical fiber transmission lines shown in FIG. 10A.

On the other hand, FIG. 10A is a view showing a state of assembly of optical fiber transmission lines No. 1 to No. 6 partly constituting an optical cable 40 which is a comparative example, whereas FIG. 10B is a view showing a colored layer as an identification marking provided in each of the optical fiber transmission lines No. 1 to No. 6 shown in FIG. 10A.

Each of these optical cables 30, 40 has a structure similar to that of the optical cable 10 (see FIGS. 6A and 6B) in which six optical fiber transmission lines 100 (see FIGS. 3A and 3B) are bundled, whereas predetermined locations thereof are colored as identification markings.

In the optical cable 40 of comparative example, as shown in FIG. 10A, the surface of each of the optical fiber transmission lines No. 1 to NO. 6 is provided with a colored layer 700. Namely, the optical fiber transmission line No. 1 as a whole is colored blue, the optical fiber transmission line No. 2 as a whole is colored yellow, the optical fiber transmission line No. 3 as a whole is colored green, the optical fiber transmission line No. 4 as a whole is colored red, the optical fiber transmission line No. 5 as a whole is colored purple, and the optical fiber transmission line No. 6 as a whole is colored white. In the optical cable 40, the six optical fiber transmission lines No. 1 to No. 6 can be distinguished from each other according to their colors.

Since the main transmission line in each of the six optical fiber transmission lines No. 1 to No. 6 in the optical cable 40 of comparative example is constituted by a single-mode optical fiber (SMF) and a dispersion-compensating optical fiber (DCF) which are fusion-spliced to each other, signals are required to propagate from the single-mode optical fiber to the dispersion-compensating optical fiber (there is a directivity concerning the signal-advancing direction). In the optical cable 40 of comparative example, however, the upstream side (SMF side) and downstream side (DCF side) cannot be distinguished from each other. Therefore, in order to grasp the upstream side of the blue optical fiber transmission line No. 1, for example, it is necessary to arrange the winding direction such that the end portion on the left side (SMF side) of the drawing is chosen, and there is a case where extra rewinding operations are needed for arranging the winding direction in the optical cable 40 of comparative example.

In the optical cable 30 according to the third embodiment, by contrast, the surface of the first end section 120 positioned on the upstream side (SMF side) of each of three upward optical fiber transmission lines No. 1 to No. 3 and three downward optical fiber transmission lines No. 4 to No. 6 is provided with a first identification marking for indicating that the marking is disposed on the upstream side and identifying the respective optical fiber transmission line as shown in FIG. 9A. On the other hand, the surface of the second end section 130 positioned on the downstream-side (DCF side) of each of the three upward optical fiber transmission lines No. 1 to No. 3 and three downward optical fiber transmission lines No. 4 to No. 6 is provided with a second identification marking for indicating that the marking is disposed on the downstream side and identifying the respective optical fiber transmission line. Here, for example, a colored layer 600 provided as the surface of the first end section 120 located on the upstream side (SMF side) is colored blue, yellow, or green corresponds to the first identification marking (see FIG. 9B). On the other hand, for example, a colored layer 650 provided as the surface of the second end section 130 located on the downstream side (DCF side) is colored red, purple, or white corresponds to the second identification marking (see FIG. 9C).

Namely, in the optical fiber transmission line No. 1 in the optical cable 30 according to the third embodiment, the surface of the first end section 120 located on the upstream side is colored blue, whereas the surface of the second end section 130 located on the downstream side is colored white. In the optical fiber transmission line No. 2 the surface of the first end section 120 located on the upstream side is colored yellow, whereas the surface of the second end section 130 located on the downstream side is colored purple. In the optical fiber transmission line No. 3, the surface of the first end section 120 located on the upstream side is colored green, whereas the surface of the second end section 130 located on the downstream side is colored red. In the optical fiber transmission line No. 4, on the other hand, the surface of the first end section 120 located on the upstream side is colored green, whereas the surface of the second end section 130 located on the downstream side is colored red. In the optical fiber transmission line No. 5, the surface of the first end section 120 located on the upstream side is colored yellow, whereas the surface of the second end section 130 located on the downstream side is colored purple. In the optical fiber transmission line No. 6, the surface of the first end section 120 located on the upstream side is colored blue, whereas the surface of the second end section 130 located on the downstream side is colored white.

According to such a configuration, if an end portion of a given optical fiber transmission line is colored blue, yellow, or green, then it is directly seen that the end portion of this optical fiber transmission line is located on the upstream side. If an end portion of a given optical fiber transmission line is colored red, purple, or white, on the other hand, then it is directly seen that the end portion of this optical fiber transmission line is located on the downstream side. Also, in the optical cable 30, it is directly seen that the blue-colored part at one end portion and the white-colored part at the other end portion are a part of a single optical fiber transmission line. Therefore, in this optical cable 30, it is unnecessary to carry out winding operations in the process of connecting with a repeater station and the like, and the production control is easy, whereby the operating cost is effectively restrained from increasing.

Fourth Embodiment of Optical Cable

A fourth embodiment of the optical cable according to the present invention will now be explained. FIG. 11A is a view showing a partial configuration of an optical cable 50 according to the fourth embodiment, FIGS. 11B and 11C are views showing colored layers as identification markings provided in each of the optical fiber transmission lines shown in FIG. 11A, and FIG. 11D is a view showing a colored layer as an identification marking provided in the optical cable shown in FIG. 11A.

As in the optical cable 30 according to the third embodiment, the optical cable 50 comprises, as six optical fiber transmission lines No. 11 to No. 16, a structure similar to that of the optical cable 10 (see FIGS. 6A and 6B) in which optical fiber transmission lines 100 each having the structure shown in FIGS. 3A and 3B are bundled, whereas predetermined locations thereof are colored as identification markings.

In the optical cable 50 according to the fourth embodiment, the surface of the first end section 120 positioned on the upstream side (SMF side) of each of three upward optical fiber transmission lines No. 11 to No. 13 and three downward optical fiber transmission lines No. 14 to No. 16 is provided with a first identification marking for indicating that the marking is disposed on the upstream side and identifying the respective optical fiber transmission line. On the other hand, the surface of the second end section 130 positioned on the downstream side (DCF side) of each of the three upward optical fiber transmission lines No. 11 to No. 13 and three downward optical fiber transmission lines No. 14 to No. 16 is provided with a second identification marking for indicating that the marking is disposed on the downstream side and identifying the respective optical fiber transmission line. Here, for example, a colored layer 800 provided as the surface of the first end section 120 located on the upstream side (SMF side) is colored blue, yellow, or green corresponds to the first identification marking (see FIG. 11B). On the other hand, for example, a colored layer 850 provided as the surface of the second end section 130 located on the upstream side (DCF side) is colored red, purple, or white corresponds to the second identification marking (see FIG. 11C).

Namely, in the optical fiber transmission line No. 11, the surface of the first end section 120 located on the upstream side and the main transmission line (including the transmission lines 111 and 112) is colored blue, whereas the surface of the second end section 130 located on the downstream side is colored white. In the optical fiber transmission line No. 12, the surface of the first end section 120 located on the upstream side and the main transmission line (including the transmission lines 111 and 112) is colored yellow, whereas the surface of the second end section 130 located on the downstream side is colored purple. In the optical fiber transmission line No. 13, the surface of the first end section 120 located on the upstream side and the main transmission line (including the transmission lines 111 and 112) is colored green, whereas the surface of the second end section 130 located on the downstream side is colored red. In the optical fiber transmission line No. 14, on the other hand, the surface of the first end section 120 located on the upstream side is colored green, whereas the surfaces of the second end section 130 located on the downstream side and the main transmission line (including the transmission lines 111 and 112) are colored red. In the optical fiber transmission line No. 15, the surface of the first end section 120 located on the upstream side is colored yellow, whereas the surfaces of the second end section 130 located on the downstream side and the main transmission line (including the transmission lines 111 and 112) are colored purple. In the optical fiber transmission line No. 16, the surface of the first end section 120 located on the upstream side is colored blue, whereas the surface of the second end section 130 located on the downstream side and the main transmission line (including the transmission lines 111 and 112) are colored white.

Further, the optical cable 50 according to the fourth embodiment is provided with a third identification marking for indicating its laying direction. While the third identification marking may be provided in each of the optical fiber transmission lines No. 11 to No. 16, it is preferably disposed at a location other than these optical fiber transmission lines, particularly at the outer periphery of the optical fiber unit 300 (see FIG. 1B) in which these optical fiber transmission lines are accommodated, i.e., the unit filler resin itself constituting the optical fiber unit 300. For example, FIG. 11D shows a state where a colored layer 900 is disposed on the surface of the optical fiber unit 300 holding the optical fiber transmission lines No. 11 to No. 16.

As a consequence of such a configuration, the optical cable 50 according to the fourth embodiment yields not only the effects similar to those o f the optical cable according to the third embodiment, but also the following effects. Namely, while the optical fiber transmission lines No. 1 to No. 6 cannot be distinguished from each other at every point of main transmission lines in the optical cable 30 according to the third embodiment, the optical fiber transmission lines No. 11 to No. 16 can be distinguished from each other in the optical cable 50 according to the fourth embodiment. For example, when repairing a damage of the laid optical cable 50, if the unit filler resin at the location to be repaired is colored red, then it is easily seen that the blue optical fiber transmission line end portion is the single-mode optical fiber section of the optical fiber transmission line No. 1, and it is easily seen that the red optical fiber transmission line end portion is the dispersion-compensating optical fiber section of the optical fiber transmission line No. 4.

As in the foregoing, end sections less influential to the transmission characteristic of the whole optical fiber transmission line are disposed at both ends of a main transmission line in the present invention. Therefore, even when the total length of the optical fiber transmission line fluctuates due to the end portion cutting at the time of processing such as cabling, the fluctuation in mean transmission characteristic of the whole optical fiber transmission line is kept small between before and after the end portion cutting as long as the cutting is effected in the end sections. Namely, as long as the main transmission line has a desirable mean transmission characteristic, the optical fiber transmission line can maintain the mean transmission characteristic as a whole even when the end section disposed at both ends of the main transmission line are cut off.

Also, when various identification markings are provided, operations of laying optical cables become more reliable and easier.

From the invention thus, described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber transmission line comprising:
a main transmission line whose polarities of chromatic dispersion at a predetermined wavelength alternate along a longitudinal direction thereof;
a first end section including an optical fiber, connected to a first end of said main transmission line, having, at said predetermined wavelength, a chromatic dispersion with an absolute value approximately equal to or less than the absolute value of mean chromatic dispersion of said main transmission line as a whole; and
a second end section including an optical fiber, connected to a second end of said main transmission line opposite from said first end, having, at said predetermined wavelength, a chromatic dispersion with an absolute value approximately equal to or less than the absolute value of mean chromatic dispersion of said main transmission line as a whole.

2. An optical fiber transmission line according to claim 1, wherein each of said first and second end sections has a length not greater than 5% of the total length of said optical fiber transmission line.

3. An optical fiber transmission line according to claim 1, wherein said first and second end sections have a maximum degree of influence with an absolute value of 0.2 ps/nm/km or less upon the mean chromatic dispersion of said optical fiber transmission line as a whole when the length of each of said first and second end sections is changed due to cutting.

4. An optical fiber transmission line according to claim 1, wherein said main transmission line includes one or more first optical fibers, having a positive chromatic dispersion at said predetermined wavelength, and one or more second optical fibers having a negative chromatic dispersion at said predetermined wavelength;
said first and second optical fibers being alternately disposed adjacent each other along the longitudinal direction of said optical fiber transmission line.

5. An optical fiber transmission line according to claim 1, wherein said main transmission line includes a unitary optical fiber in which one or more first portions having a positive chromatic dispersion at said predetermined wavelength, and one or more second portions having a negative chromatic dispersion at said predetermined wavelength are alternately disposed adjacent each other along a longitudinal direction thereof.

6. An optical cable comprising a plurality of transmission lines each including the optical fiber transmission line according to claim 1.

7. An optical cable according to claim 6, wherein each of said plurality of transmission lines has a first identification marking for indicating a part located on the upstream side in a signal-propagating direction and distinguishing the respective transmission line from the rest of transmission lines, and a second identification marking for indicating a part located on the downstream side in said signal-propagating direction and distinguishing the respective transmission line from the rest of transmission lines.

8. An optical cable according to claim 6, wherein said optical cable has a third identification marking indicating a laying direction of said optical cable.

9. An optical fiber transmission line comprising:
a main transmission line having a transmission characteristic changing along a longitudinal direction thereof;
a first end section, connected to a first end of said *main transmission line, having a chromatic dispersion with an absolute value of 5 ps/nm/km or less at a predetermined wavelength; and
a second end section, connected to a second end of said main transmission line opposite from said first end, having a chromatic dispersion with an absolute value of 5 ps/nm/km or less at said predetermined wavelength.

10. An optical fiber transmission line according to claim 9, wherein each of said first and second end sections has a length not greater than 5% of the total length of said optical fiber transmission line.

11. An optical fiber transmission line according to claim 9, wherein each of said first and second end sections has a length of 1000 m or less.

12. An optical fiber transmission line according to claim 9, wherein said first and second end sections have a maximum degree of influence with an absolute value of 0.2 ps/nm/km or less upon a mean chromatic dispersion of said optical fiber transmission line as a whole when the length of each of said first and second end sections is changed due to cutting.

13. An optical fiber transmission line according to claim 9, wherein each of said, first and second end sections has a mode field diameter substantially equal to the mode field diameter of a pigtail fiber, extending from an optical amplifier to be connected thereto, for guiding signals into said optical amplifier.

14. An optical fiber transmission line according to claim 9, wherein said main transmission line comprises a plurality of optical fibers having transmission characteristics different from each other at said predetermined wavelength.

15. An optical fiber transmission line according to claim 9, wherein said main transmission line includes a unitary optical fiber in which portions having transmission characteristics different from each other are arranged along a longitudinal direction thereof.

16. An optical fiber transmission line according to claim 9, wherein said main transmission line as a whole has a mean chromatic dispersion with an absolute value of 5 ps/nm/km or less at said predetermined wavelength.

17. An optical fiber transmission line according to claim 16, wherein said main transmission line comprises a first optical fiber having a positive chromatic dispersion at said predetermined wavelength and an effective area of 40 $\mu m^2$ or more, and a second optical fiber having a negative chromatic dispersion at said predetermined wavelength;
said first and second optical fibers being disposed such that signals successively propagate through said first and second optical fibers.

18. An optical fiber transmission line according to claim 16, wherein said main transmission line has a unitary optical fiber in which one or more first portions having a positive chromatic dispersion at said predetermined wavelength, and one or more second portions having a negative chromatic dispersion at said predetermined wavelength are alternately disposed adjacent each other along a longitudinal direction thereof.

19. An optical fiber transmission line according to claim 18, wherein each of said first and second portions has a mean chromatic dispersion with an absolute value of 5 ps/nm/km or less at said predetermined wavelength.

20. An optical cable including a plurality of transmission lines each having a structure identical to that of the optical fiber transmission line according to claim 1.

21. An optical cable according to claim 20, wherein said plurality of transmission lines comprise an upward transmission line group of N (>0) lines and a downward transmission line group of N (>0) lines having signal-advancing directions different from each other;
wherein each of said optical fiber transmission lines included in said upstream transmission line group has a first identification marking, disposed at a portion located upstream in the signal-advancing direction thereof, for indicating that said portion is located on the upstream side and identifying the respective optical fiber transmission line, and a second identification marking, disposed at a portion located downstream in the signal-advancing direction thereof, for indicating that said portion is located on the downstream side and identifying the respective optical fiber transmission line; and
wherein each of said optical fiber transmission lines included in said downstream transmission line group has said first identification marking at a portion located upstream in the signal-advancing direction thereof, and said second identification marking disposed at a portion located downstream in the signal-advancing direction thereof.

22. An optical cable according to claim 21, wherein said first and second identification markings are each disposed on any of said first and second end sections constituting said optical fiber transmission line.

23. An optical cable according to claim 21, wherein said optical cable has a third identification marking indicating a laying direction of said optical cable.

24. An optical cable according to claim 23, wherein said third identification marking is disposed at a predetermined location excluding said optical fiber transmission lines included in each of said upward and downward transmission line groups.

25. An optical cable according to claim 23, wherein said third identification marking is disposed on a surface of an optical fiber unit accommodating said optical fiber transmission lines included in each of said upward and downward transmission line groups.

* * * * *